Jan. 27, 1948. H. NUTT ET AL. Re. 22,967

AUTOMATIC TRANSMISSION

Original Filed Jan. 4, 1941 5 Sheets-Sheet 1

Inventors:
Harold Nutt and
Richard L. Smirl
By: Edward C. Fritzhugh
Atty.

Jan. 27, 1948. H. NUTT ET AL Re. 22,967

AUTOMATIC TRANSMISSION

Original Filed Jan. 4, 1941 5 Sheets-Sheet 2

Inventors:
Harold Nutt and
Richard L. Smirl.
By:
Edward C. Gritzbaugh
Atty.

Jan. 27, 1948. H. NUTT ET AL Re. 22,967
AUTOMATIC TRANSMISSION
Original Filed Jan. 4, 1941 5 Sheets-Sheet 3
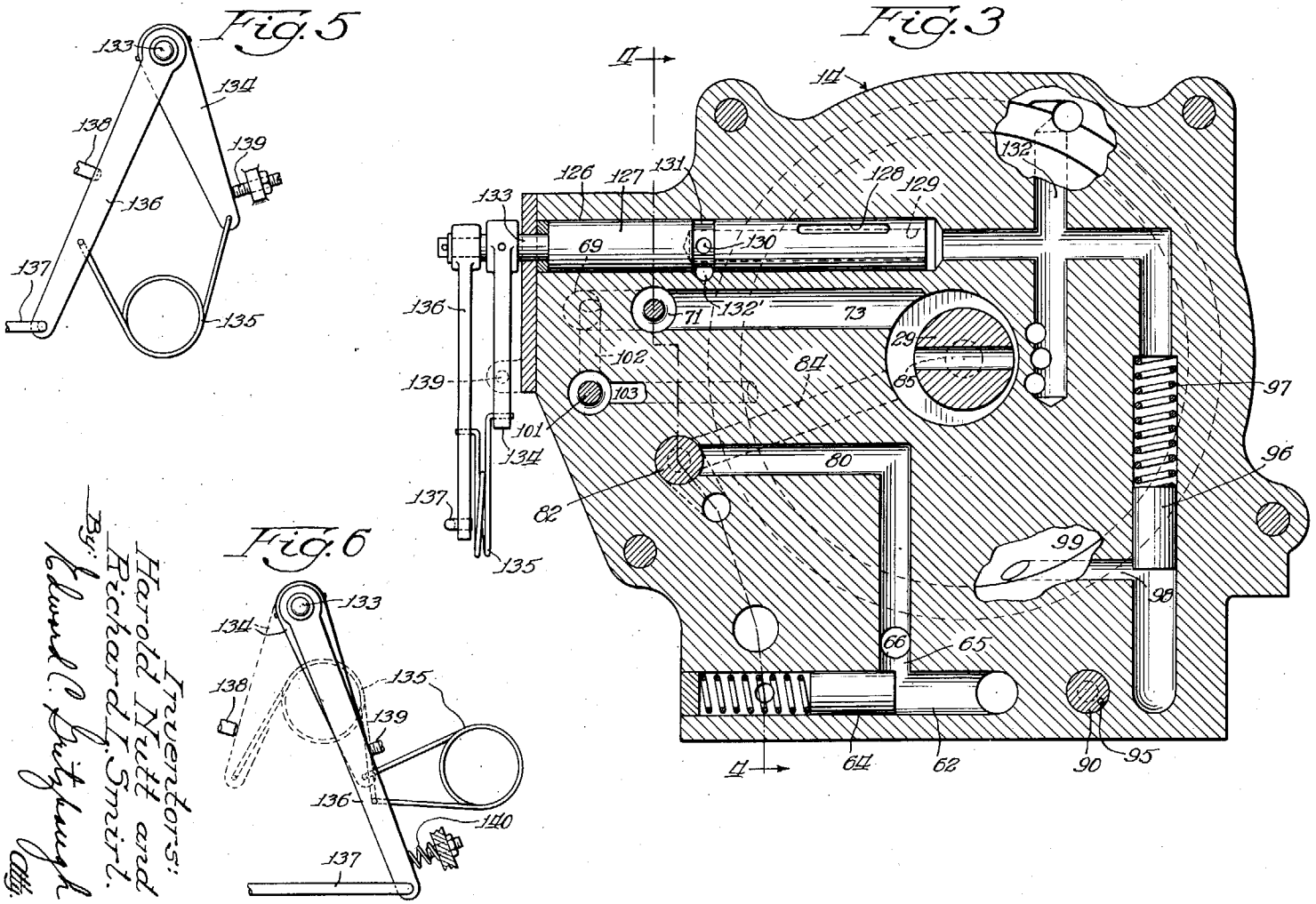
Inventors:
Harold Nutt and
Richard L. Smirl.
By: Edward C. Fritzsburgh
Atty.

Jan. 27, 1948. H. NUTT ET AL Re. 22,967
AUTOMATIC TRANSMISSION
Original Filed Jan. 4, 1941 5 Sheets-Sheet 4
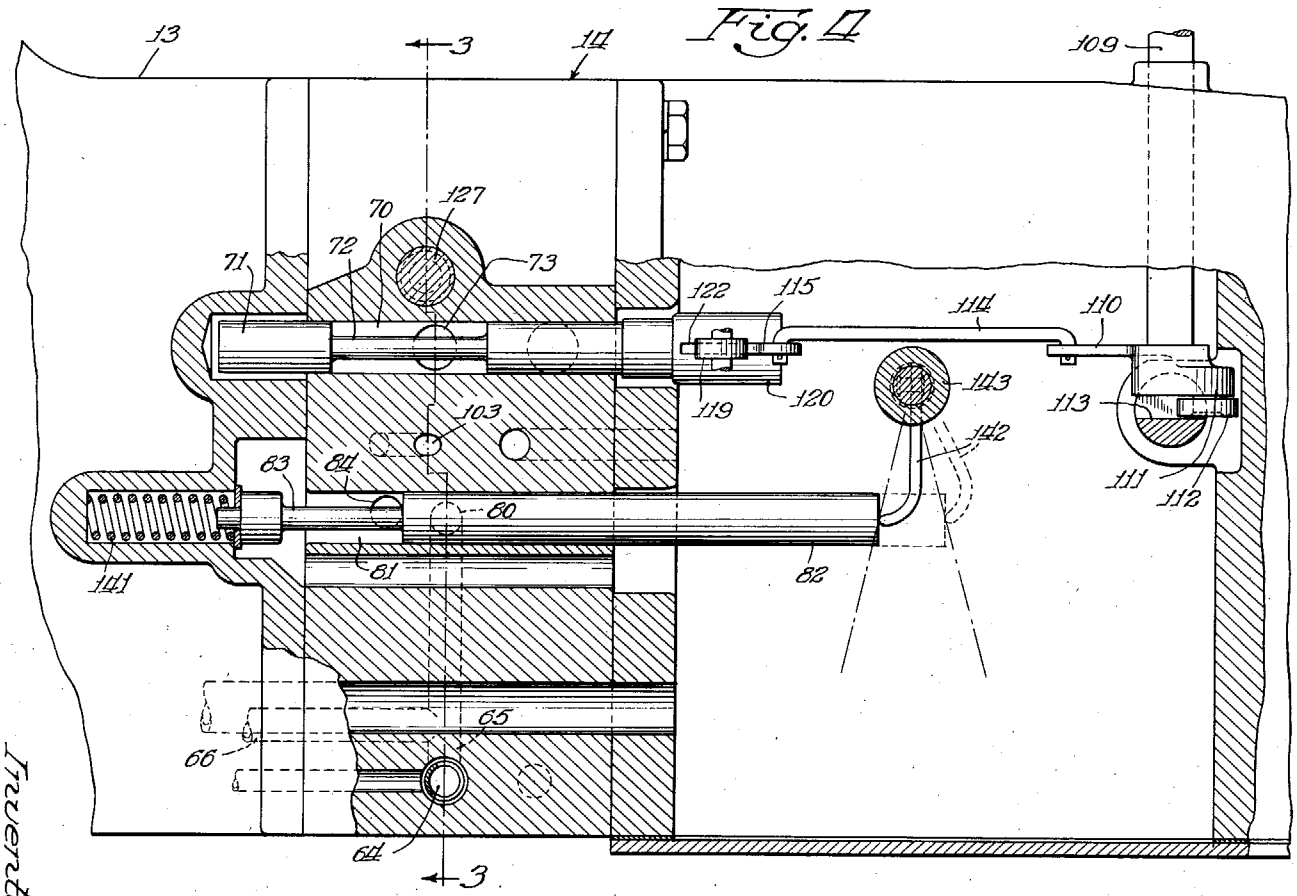
Inventors:
Harold Nutt and
Richard L. Smirl.
By: Edward C. Dritzbaugh
Atty.

AUTOMATIC TRANSMISSION

Original Filed Jan. 4, 1941 5 Sheets-Sheet 5

Inventors:
Harold Nutt and
Richard L. Smirl
By: Edward C. Fritzborough
Atty.

Reissued Jan. 27, 1948

Re. 22,967

UNITED STATES PATENT OFFICE 22,967

AUTOMATIC TRANSMISSION

Harold Nutt, Chicago, Ill., and Richard L. Smirl, Detroit, Mich., assignors to Borge-Warner Corporation, Chicago, Ill., a corporation of Illinois Original No. 2,332,593, dated October 26, 1943, Serial No. 373,201, January 4, 1941. Application for reissue November 22, 1943, Serial No. 511,356

17 Claims. (Cl. 74—189.5)

This invention relates to automatic transmissions and particularly to automatic transmissions comprising a fluid device combined with gearing.

A large number of automatic transmissions have been devised all of which may be classified into a relatively small number of types. Each type presents its own design problems and the completeness with which these problems are solved determines the amount of success the transmission will have in the field. One such fundamental type is the hydrodynamic or "Foettinger" transmission which employs two or more vaned rotors coupled together through a fluid. The problem attendant upon the use of a hydrodynamic device in an automatic transmission include among others that of getting sufficient torque multiplication to satisfy the requirements for an automobile and to do this at satisfactory efficiencies. This has led to the use of gearing in addition to the torque converter and to various clutching arrangements for substituting another drive for the torque converter at the speeds at which the torque converter is inefficient. With the addition of these devices the transmission becomes more complex and expensive.

Another problem encountered in the hydrodynamic type of transmission is that of operating an associated positive control element to effect a shift as, for example, from neutral to reverse. At idling speeds of the engine enough torque is transmitted through the hydrodynamic device to render the engagement of a positive toothed control device difficult, if not impossible.

The principal object of this invention is to provide an automatic transmission which utilizes the advantages of a hydraulic torque converter and makes full provision for its several shortcomings with a minimum complexity of controls.

Another object of this invention is to provide an automatic transmission of the hydraulic torque converter type in which a satisfactory reversing mechanism is employed.

Another object of this invention is to provide a simplified hydraulic system for operating an automatic transmission, the system including a clutch which utilizes the pressure within the torque converter to change its condition.

Yet another object of this invention is the provision of improved means for starting an engine through the transmission by pushing the car in which the transmission is installed.

These and other objects of the invention will become apparent from the following description when taken together with the accompanying drawings in which:

Fig. 1 is a plan view in section of the transmission.

Fig. 1*a* is a fragmentary section taken along line 1*a*—1*a* of Fig. 1.

Fig. 3 is a vertical section through the valve block taken along line 3—3 of Fig. 4.

Fig. 4 is a side view of the rear portion of the transmission showing the valves and a portion of the controls therefor taken along line 4—4 of Fig. 3;

Figs. 5 and 6 show the linkage for operating one of the valves in the transmission.

Figure 1:
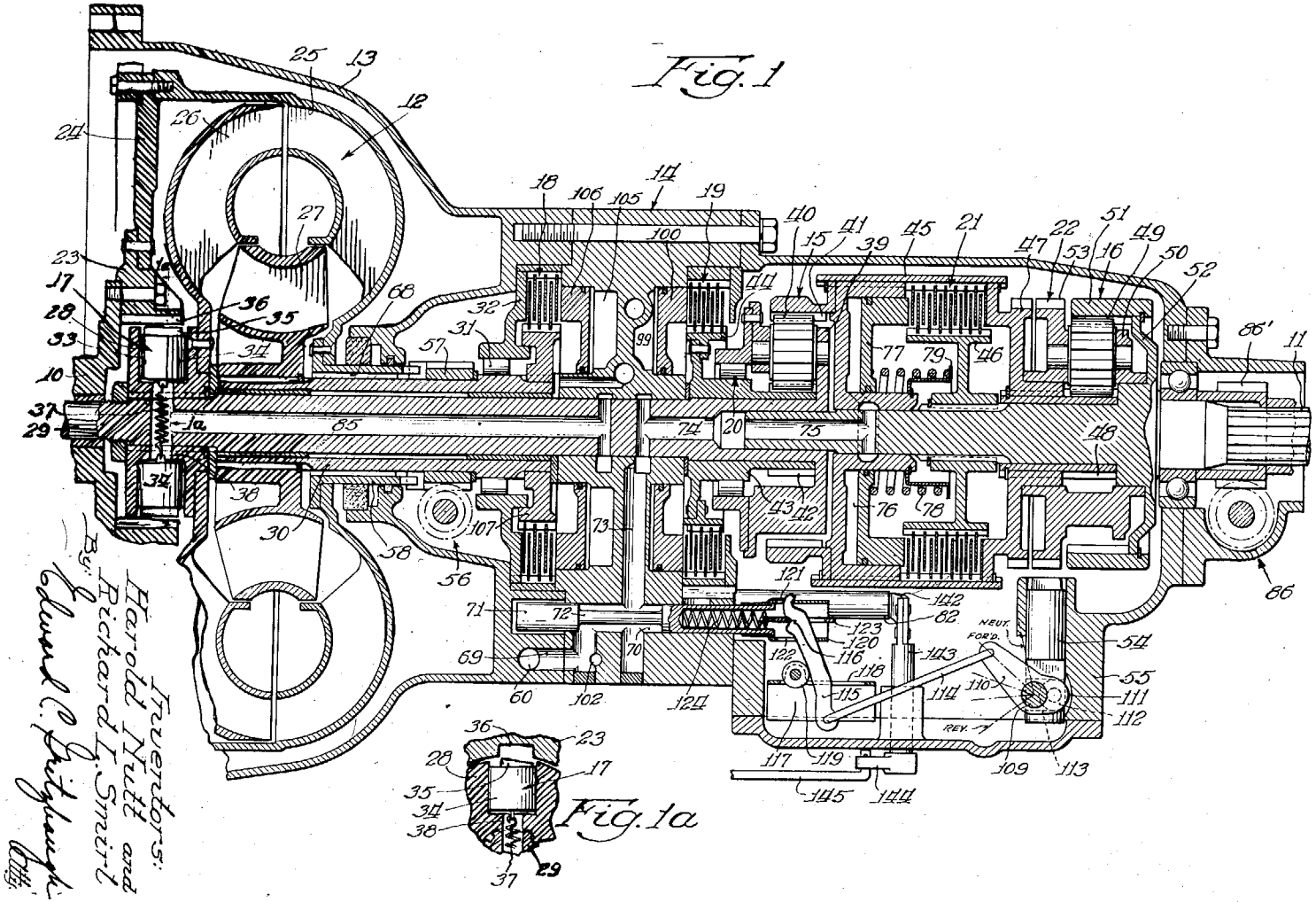

Referring now to the drawings for a detailed description of the invention and particularly to Fig. 1, the transmission in its preferred form is comprised in general of a drive shaft 10, a driven shaft 11, a hydrodynamic torque converter 12 located within bell housing 13, a valve block 14 secured to bell housing 13, a planetary change speed gearing 15, and a planetary reverse gear 16. Various clutches and controls are included for operating and controlling the torque converter and planetary gear set including a positive clutch 17 for locking up the torque converter, a hill brake 18 to be used in conjunction with torque converter 12, a brake 19 for conditioning planetary gear set 15 for overdrive operation, a roller and cam type automatic clutch 20 for conditioning planetary gear set 15 for direct drive, a releasable clutch 21 which may be released to disconnect the driven shaft 11 from planetary gear set 15 to provide a neutral, and a positive brake 22 of the toothed type for arresting one of the elements of the planetary gear set 16 to provide a reverse drive.

The power is transmitted from drive shaft 10 to a forging 23 bolted to a flange on drive shaft 10, said forging 23 supporting in turn a flywheel 24 and a vaned pump member 25 bolted to flywheel 24. These last three elements form a chamber which is normally filled with fluid under pressure. Opposite vaned pump member 25 is a vaned turbine member 26 which comprises the driven element of the hydraulic torque converter 12. Torque conversion or multiplication is secured by means of a vaned stator 27 interposed between the exit of the turbine vanes and the entrance to the pump vanes. Turbine member 26 is riveted to a carrier 28 which is splined to an intermediate shaft 29. Stator 27 is splined to a sleeve 30 which is anchored against rotation in a backward direction with respect to drive shaft 10 by means of a roller-and-cam type one way brake 31 reacting against a plate 32 non-rotatably mounted in bell housing 13.

Carrier 28 is formed with radial bores 33 in which are mounted pistons 34 having at the outer extremities thereof chamfered teeth 35 (Fig. 1a) which are adapted to engage slots 36 in forging 23. Said pistons 34 are biased to a retracted position in carrier 28 by a spring 37 passing through a suitable opening 38 in the carrier and intermediate shaft 29. The chamfer on teeth 35 is in such a direction that when drive shaft 10 is rotating faster than intermediate shaft 29, teeth 35 will not engage with slot 36 to form a clutching connection between drive shaft 10 and intermediate shaft 29, but will permit such clutching connection when the speed of drive shaft 10 drops down to the speed of intermediate shaft 29.

Intermediate shaft 29 extends rearwardly to planetary gear set 15 and drives the carrier 39 of this gear set. Upon carrier 39 are mounted planet gears 40 which mesh with a ring gear 41 and with a sun gear 42. Said sun gear 42 is formed from a sleeve 43 which is flanged and riveted to the rotatable element 44 of brake 19. Ring gear 41 is splined to a drum 45 which constitutes the driving element of disc clutch 21, the driven element 46 being splined to driven shaft 11. Also splined to drum 45 is a connecting casting 47 which transfers the drive from drum 45 to the sun gear 48 of planetary gear set 16. Said sun gear 48 meshes with planet gears 49 mounted on a carrier 50 which is free to rotate about driven shaft 11. Planet gears 49 in turn mesh with a ring gear 51 which is splined to a flange 52 rotatable with driven shaft 11.

The rotatable element of reverse brake 22 is comprised of a toothed member 53 which may be in the form of an ordinary spur gear, mounted to rotate with carrier 50. Beside driven shaft 11 and aligned with toothed member 53 is a sprag 54 slidably mounted in gear housing 55 and fixed against rotation. When sprag 54 is moved toward toothed member 53 so as to engage the teeth thereof, carrier 50 is held against rotation and driven shaft 11 will be driven in a reverse direction with respect to drive shaft 10 when the drive of shaft 10 is impressed on sun gear 48.

The various conditions of operation of the transmission are as follows:

For neutral and all forward speeds, sprag 54 is withdrawn from toothed member 53. With sprag 54 withdrawn, neutral is obtained by releasing clutch 21 which breaks completely the connection between the drive and driven shafts.

For forward speed in the lowest ratio, torque converter lockout clutch 17 is released, brakes 18 and 19 are released and clutch 21 is engaged. The drive is then transmitted from drive shaft 10 through the torque converter to intermediate shaft 29 and thence to planet gears 40 of planetary gear set 15. At this point the load of the driven shaft 11 is transmitted through clutch 21 to ring gear 41 and accordingly sun gear 42 will tend to rotate ahead of carrier 39. This, however, is prevented by roller-and-cam clutch 20 which locks the carrier to the sun gear, thereby effecting direct drive through planetary gear set 15. In the lowest ratio possible, therefore, the drive between drive shaft 10 and driven shaft 11 is effected through, and the torque is multiplied by, torque converter 12. It will be noted that stator 27 is held against rotation by one way brake 31 as long as torque conversion takes place in the converter and that thereafter it is free to rotate with the impeller 25 of the converter.

For the next ratio, clutch 17 is engaged to couple drive shaft 10 directly with intermediate shaft 29 and thereby lock up torque converter 12. The clutch is centrifugally conditioned for engagement considerably below the end point of the torque conversion speed of the converter, but it can be engaged at the will of the driver at any speed above this conditioned speed by momentarily releasing the throttle, thereby permitting synchronization to occur. The clutch will remain engaged at all speeds above the centrifugally conditioned speed unless forced back by the means and under the conditions to be hereinafter described. The pawls will remain engaged below the conditioned speed so long as continuous torque is being transmitted. When the vehicle is stopped, the torque between members 34 and 36 will reverse at some point before the vehicle comes to rest, thus enabling the clutch to release automatically.

The next and highest ratio is obtained by engaging brake 18 to hold sun gear 42, thereby conditioning planetary gear set 15 for overdrive as will be described in detail later.

Reverse is obtained by releasing clutches 17 and 21 (the former releasing automatically when the car is at rest) and releasing also brake 19. Sprag 54 is engaged with toothed member 53 to hold carrier 50 and the drive is therefore reversed through planetary gear set 16, the drive being through connecting casting 47 to sun gear 48.

The description thus far has been concerned merely with the mechanism for transmitting the torque from drive shaft 10 to driven shaft 11. The controls for effecting the various shifts described above and others to be described hereinafter will now be detailed.

With the exception of the sprag and the roller and cam devices the various clutches and brakes are controlled, or operated and controlled, by hydraulic pressure. The controls therefor comprise in the main, pumps, valves, and passages so interconnected with the various clutches and brakes as to supply operating pressure to the proper device at the time desired and also to remove operating pressure from certain devices in an emergency and under the control of the operator to effect a down-shift. For example, means are provided for releasing brake 19 to reduce the drive from overdrive to direct drive, and additional means are provided to release clutch 17 to restore the drive through the torque converter, both of these down shifts being under the control of the operator.

Figure 2:
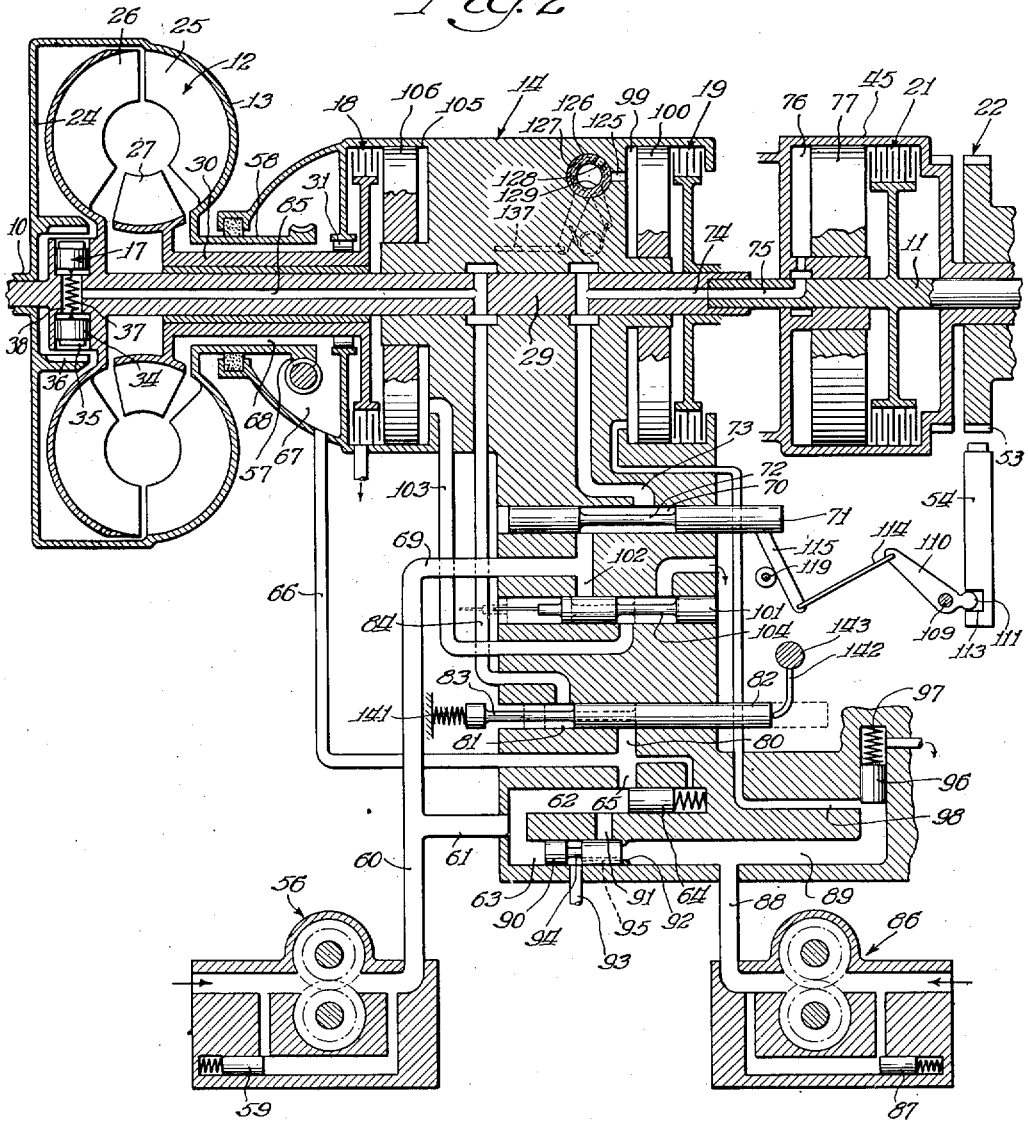
Fig. 2 is a schematic layout of the hydraulic system.

Referring now to Fig. 2, the various clutches and brakes are shown schematically, together with the hydraulic circuits to and from these elements and their respective control valves. Dual hydraulic systems are provided, fluid pressure for the first system being derived from a pump 56 which is driven by means of gears 57 which in turn are driven from a sleeve 58 drivingly connected to impeller member 25 of hydraulic torque converter 12. Pump 56 therefore is operated whenever drive shaft 10 is turning. The oil from pump 56 is maintained at a pressure of approximately 60 pounds per sq. inch by means of a relief valve 59. A pressure line 60 conducts the oil from pump 56 to a branch 61 which is divided into two conduits 62 and 63. In conduit 62 is a reducing valve 64 which reduces the pressure in side outlet 65 to approximately 30 pounds per sq. inch. Oil at this pressure is then conducted through conduit 66 to a chamber 67 surrounding pump gear 57 and communicating through a passageway 68 with the interior of the hydraulic torque converter 12. It will be noted that the entire chamber formed by flywheel 24 and impeller 25 is filled with fluid at 30 pounds per sq. inch pressure, which means that the outer surfaces of the pistons forming clutch 17 are acted upon by this pressure whenever pump 56 is in operation. As will be described in greater detail later, this pressure tends to assist springs 37 to retract the pistons to release the clutch 17 and is utilized to effect a down-shift of this clutch under certain circumstances.

A second branch 69 in pressure line 60 conducts fluid at 60 pounds per sq. inch pressure to valve chamber 70 in which is located the control valve 71 for main clutch 21. Said valve 71 has a central portion 72 of reduced cross section to permit the fluid to pass therearound into conduit 73 which communicates with a central bore 74 located in shaft 29. Driven shaft 11 contains a similar bore 75 in communication with bore 74 and conducts the fluid to an annular chamber 76 which is mounted for rotation with drum 45 of clutch 21. Within annular chamber 76 is an annular piston 77 which is slidable axially to compress the driving and driven members of clutch 21 together and thereby couple driven shaft 11 with drum 45 and its associated ring gear 41 (see Fig. 1).

Valve 71 is shown in the position it assumes when the transmission is conditioned for forward drive by the operator. The valve is slidable to the right to close off branch 69 and simultaneously to permit the fluid behind piston 77 to escape beyond the right hand edge (Fig. 2) of valve block 14. This releasing action is augmented by a retractor spring 78 (Fig. 1) which is fixed at one end 79 relative to chamber 76 and the other end of which bears against piston 77.

Thus when the main clutch control valve 71 is positioned as shown in Fig. 2 and pump 56 is operated, fluid under pressure is conducted simultaneously to the hydraulic torque converter 12, to the outer surfaces of clutch pistons 34 of clutch 17, and to chamber 76 of clutch 21 to operate the latter clutch.

Under normal conditions fluid under 30 pounds per sq. inch pressure will be conducted through a branch 80 to a second valve chamber 81 in which is located a valve 82 for controlling the positive clutch 17. Said valve 82 is normally located to the right (shown in dotted lines) of the position shown in Fig. 2 so that the portion 83 of reduced cross section is in alignment with branch 80 and also with a side outlet 84 which communicates with a central bore 85 in the forward end of intermediate shaft 29. This bore is in communication with opening 38 and conducts the fluid under 30 pounds per sq. inch pressure to the under side of pistons 34 of the torque converter lock up clutch 17. Pistons 34 are therefore balanced insofar as the pressure within the converter chamber is concerned and are subject only to the action of centrifugal force on the one hand and the retracting action of spring 37 on the other hand. Said spring 37 is of such strength as to maintain pistons 34 in retracted position until the vehicle is moving at a speed of approximately 18 miles per hour, at which speed centrifugal force overcomes the retractive effort of spring 37 and moves the pistons radially outwardly to engage teeth 35 with slots 36.

Thus when valve 71 is positioned as shown and valve 82 is in the dotted position, pump 56 being in operation, main clutch 21 will be operated and the hydraulic torque converter 12 will likewise be operated to transmit the drive at what corresponds to low speed from drive shaft 10 to driven shaft 11. Simultaneously, pistons 34 of clutch 17 will be balanced hydraulically but will be subject to centrifugal force, and when the speed of the vehicle becomes sufficiently great, clutch 17 will become operative to lock up the hydraulic torque converter and transmit the drive of drive shaft 10 directly to intermediate shaft 29 instead of through the intermediary of the torque converter.

To obtain the next and highest speed ratio through the transmission, clutch 19 is operated to arrest the rotation of sun gear 42. This is accomplished hydraulically by the second hydraulic system previously referred to, which is controlled by a piston type valve in the first hydraulic system.

The second hydraulic system is comprised of a pump 86 which is driven by gears 86' (Fig. 1) drivingly connected to driven shaft 11 so as to make pump 86 responsive to vehicle speed. The pressure of the fluid supplied by pump 86 is maintained at approximately 50 pounds per sq. inch by a relief valve 87. It will be noted that this pressure is ten pounds less than that in the first system. A pressure line 88 conducts the fluid under pressure to a conduit 89 in valve block 14. Said conduit 89 is in communication at one end with branch 63 of the first hydraulic system, a valve 90 being interposed between the two systems. Said valve 90 is free to move to the left a distance sufficient to uncover a side outlet 91 communicating with branch 62 in the first hydraulic system, and by this means, fluid pressure may be supplied from the second system to the first whenever the engine is not in operation and it is desired to effect normal operation of the transmission. Thus when it is desired to start the engine by pushing the car, driven shaft 11 will be rotated and will cause pump 86 to operate, which in turn will supply fluid under pressure to conduit 89 and will move valve 90 to the left (Fig. 2) to uncover outlet 91 and permit the fluid under pressure to enter the first hydraulic system. After the engine begins to operate and pump 56 supplies fluid at 60 pounds per sq. inch pressure to branch 63, the ten pound pressure differential will move valve 91 to the right until it strikes abutment 92 in conduit 89. In this position outlet 91 is blocked and a bleed outlet 93 is uncovered by means of a section 94 of reduced diameter in valve 90. A bleed opening 95 connects conduit 89 with bleed outlet 93 to prevent a rapid building up of pressure in the second hydraulic system after the car begins to move. The purpose of the delay in establishing a 50 pound pressure in the second system is to prevent the operation of the overdrive clutch 19 until a speed of approximately 18 miles per hour is reached. However, if pump 56 of the first hydraulic system is not in operation, valve 90 will be in its right-hand position (Fig. 2) and bleed opening 93 will be covered so that there is no delay in building up the pressure in the first system under these circumstances and the torque converter and main clutch are immediately effective to crank the engine.

The overdrive outlet of conduit 89 is controlled by overdrive cutin valve 96 which is biased by a spring 97 to closed position and under low pressure conditions covers outlet conduit 98 and prevents fluid from entering therein. When a pressure of 50 pounds per sq. inch is reached, however, valve 96 is moved against the resistance of its biasing spring 97 to uncover outlet 98 and permit fluid under 50 pounds per sq. inch pressure to pass through this conduit to an annular chamber 99 in valve block 14. In chamber 99 is an annular piston 100 which is movable axially to compress the driving and driven members of brake 19 and thereby arrest the rotation of sun gear 42 to establish overdrive through the transmission. Engagement will be graduated by the rate of delivery of pump 80 and vent 95, while the delay valve 96 insures that adequate pressure will be available for full engagement, thereby preventing long slip periods when the car is being driven at a speed which is approximately the same as the cut-in speed.

To recapitulate, the second hydraulic system is used primarily to operate brake 19 to establish overdrive at a particular speed of the driven shaft. It may also be used to supply oil under pressure to the first hydraulic system if for any reason pump 56 of the first system is not in operation and it is desired to operate torque converter 12 and clutch 21 as for example, to start the engine by pushing the car.

The stator brake 18 is likewise operated by fluid pressure and is controlled by valve 101 in valve block 14. Said valve 101 is slidable in its bore to a left hand position (shown dotted in Fig. 2) wherein it connects a branch 102 of branch 69 to a conduit 103 by means of a section 104 of reduced cross section. When so moved, fluid under pressure is conducted to a chamber 105 of annular cross section in which is disposed an annular piston 106 which is adapted to compress the driving element 107 and reaction element of brake 18 and thereby arrest the rotation of stator 27. It will be recalled that at speeds above 18 miles per hour clutch 17 is operated to connect pump 25 and turbine 26 together which relieves stator 27 of backward reactive force and said stator 27 is then free by virtue of the one-way holding characteristic of brake 31, to rotate in a forward direction under the influence of the fluid in the torque converter. This forward rotation may be arrested by bypassing one way brake 31 and holding sleeve 30 through its splined connection with driving element 107 of brake 18. When so held a powerful braking action is secured which assists in keeping down the speed of the vehicle.

Having described the hydraulic circuits from the pump to the various clutches and brakes, the means for controlling the valves which in turn control the hydraulic circuits will now be detailed.

Referring particularly to Figs. 1, 2 and 4, the "forward," "neutral," and "reverse" control may comprise the usual lever (not shown) at the steering wheel of the automobile which is connected by suitable linkage (not shown) to a rock shaft 109 disposed vertically of the transmission and immediately below sprag 54. Said rock shaft 109 is provided with two arms 110 and 111 the first-mentioned of which controls the main clutch valve 71 and the second of which is mechanically connected through a roller 112 and slot 113 to sprag 54. Shaft 109 may be rocked through approximately 120° from a "neutral" position wherein sprag 54 is completely withdrawn from toothed member 53, through a "forward" position wherein sprag 54 is not yet in engagement with toothed member 53 but is nearly in contact with said member, to a "reverse" position wherein sprag 54 engages the teeth of member 53 to arrest the rotation of planet carrier 50.

Arm 110 is connected through a link 114 to a lever 115 the opposite end of which is connected to main clutch valve 71. Said lever 115 is in the nature of a floating lever and is supported by a plate 117 in which is a slot 118 for restraining the lever against lateral movement with respect to valve 71 and link 114. The fulcrum for lever 115 is provided by a roller 119 mounted on plate 117. The connection with valve 71 comprises a sleeve 120 which is slotted at 121 and 122 to receive the upper end of lever 115. A slotted plate 123 engages a notch 116 in lever 115 and is resiliently urged to the right (Fig. 1) by a spring 124 contained in a recess in valve 71. Because of the relative location of notch 116 and slot 121 the spring pressure will tend to rotate floating lever 115 in a counterclockwise direction (Fig. 1) but since such rotation will be restrained by link 114 and arm 110, the net result will be to tend to return valve 71 to the position shown in Fig. 1, i. e., to bias valve 71 to the left.

It will be noted that because of the particular linkage employed it will be necessary to pass through the "forward" position in order to condition the transmission for "reverse." This causes clutch 21 to be engaged momentarily each time it is desired to advance sprag 54 into toothed member 53. Since the car at such time is presumably standing still, this will have the effect of momentarily stopping toothed member 53, thus preventing unpleasant tooth clash, and then releasing said tooth member to permit the sprag to enter the teeth, if for any reason the teeth have become butt-ended. This arrangement of links and valves and its result upon the action of the toothed member with which reverse sprag 54 is to engage, constitutes one of the principal features of this invention. By this means the creep, which is usually present in a torque converter drive and which would normally render substantially impossible the insertion of sprag 54 into toothed member 53, is eliminated just prior to the actuation of reverse sprag 54 and a smooth operation of the reverse shift is assured. It will also be observed that the operation of clutch 21 to arrest the rotation of toothed member 53 is perfectly synchronized with the movement of sprag 54.

After the transmission has been conditioned for forward drive the torque converter lock up clutch 17 is automatically operated and in due course the overdrive brake 19 is likewise operated automatically. Situations arise, however, where it is necessary to shift out of overdrive into direct drive in order to secure the benefit of the greater torque obtainable in this ratio. The down shift may be effected by the following instrumentalities:

Referring particularly to Figs. 2, 3, 5 and 6, chamber 99 associated with overdrive brake 19 is provided with an outlet passage 125 which communicates with a transverse bore 126 in valve block 14. In bore 126 is located a valve 127 which is rotatable through an arc of approximately 45°. In one extreme position of valve 127 conduit 125 is aligned with a slot 128 in the valve, which communicates with the hollow interior 129 of the valve. The hollow interior communicates with a main vent 132 and also through a series of openings 130 and an annular groove 131 in valve 127 with an auxiliary vent 132' leading to the exterior of valve block 14. The purpose of auxiliary vent 132' is to prevent leakage past the valve and shaft 133. In the other extreme position of valve 127, slot 128 is not in alignment with passageway 125 and hence the pressure in chamber 99 is not affected but is controlled solely by overdrive valve 96.

Valve 127 is provided with a stem 133 to which is pinned an arm 134. Said arm is in turn connected through a grasshopper type spring 135 to a second arm 136 rotatably mounted on stem 133 and connected at its free extremity through a rod 137 and associated linkage (not shown) to the accelerator pedal of the automobile. Suitable stops 138 and 139 are provided on valve block 14 to limit the angular travel of arm 134. It is undesirable generally to have the valve move with the accelerator pedal and accordingly spring 135 serves to prevent rotation of the valve to a down shifting position until the accelerator reaches its wide open position, whereupon an overcenter condition will exist as shown in Fig. 6 and spring 135 will be snapped to the left to the dotted position. The point at which this action takes place may be made apparent by the provision of a spring stop 140 which interposes a slight resistance to the movement of arm 136 to its overcenter position so that if the driver does not wish to down shift he will not depress the accelerator beyond the point of increased pressure. In a similar manner grasshopper spring 135 will prevent a return to overdrive until the operator substantially releases the accelerator pedal, which he will do naturally after he has no further need for increased acceleration.

Assuming that the vehicle is traveling at a speed at which clutch 17 is engaged but overdrive brake 19 is not yet engaged, and the operator wishes to down shift to the torque converter, it will be necessary to remove the fluid pressure from behind pistons 34 in order to obtain a sufficient differential pressure to withdraw the pistons. Since clutch 17 is a positive clutch, however, a mere differential in pressure will not be sufficient if an appreciable amount of torque is being transmitted through the clutch at the time. It will be necessary, in addition, to remove the torque for an instant from teeth 35 to enable the pressure differential to become effective. Accordingly the following mechanisms are employed to effect this down shift.

Referring momentarily to Fig. 2 it will be observed that valve 82 controls the pressure behind pistons 34. In order to remove this pressure, valve 82 must be moved to the left to block the pressure side 80 and to vent conduit 84. Normally, valve 82 is biased to the right by a spring 141, the movement to the right being limited by an arm 142 which moves with a rock shaft 143. As shown in Fig. 1, rock shaft 143 is provided with an arm 144 which is connected by suitable linkage 145 to the accelerator pedal or to some other manual control (not shown). When it is desired to down shift into the torque converter, the control is moved and this movement is transmitted through linkage 145, arm 144, rock shaft 143 and arm 142 to valve 82, thereby moving the valve to the left against the action of spring 141 (Fig. 4). This removes pressure from behind pistons 34 and establishes the pressure differential which will be utilized to release the clutch.

Figure 7:
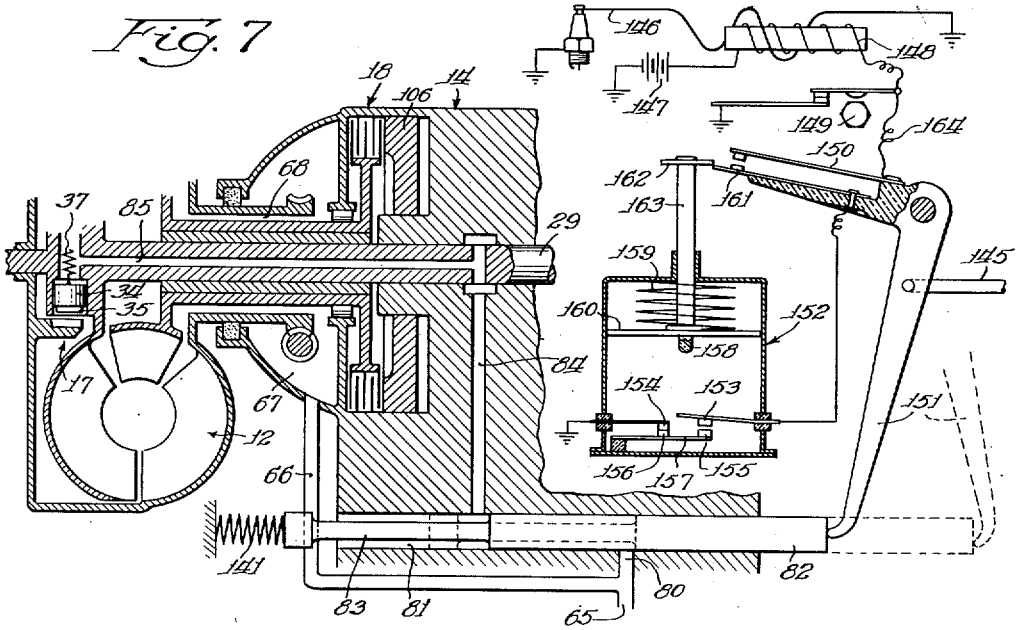
Figs. 7, 8 and 9 are schematic diagrams showing the operation of the manual over-control for one of the clutches.
Figure 8:
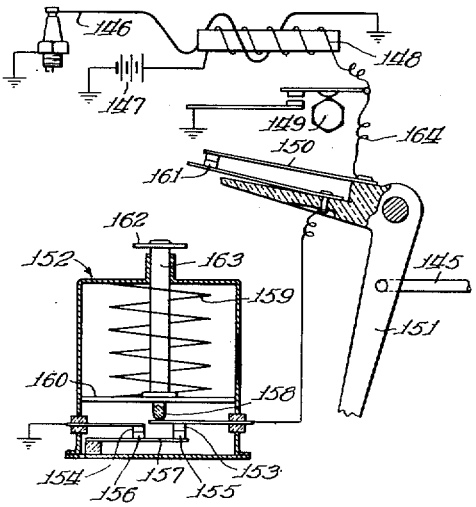
Figure 9:
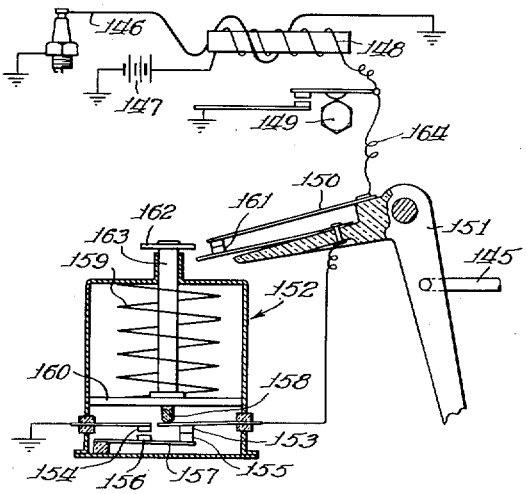

Referring now to the schematic diagrams shown in Figs. 7, 8 and 9, the movement of the control not only moves valve 82 to the left (Fig. 7) but also cuts the ignition momentarily to remove the torque on teeth 35. The current for the ignition circuit 146 is derived from a battery 147, or other source of electrical energy, and a coil 148, the circuit through which is interrupted periodically in timed relation to the movement of the crank shaft of the engine through an interrupter 149. Connected in shunt with the circuit through the interrupter 149 is a second circuit 164 which includes a switch 150 mounted on a pivoted bell crank 151. The condition of the shunt circuit and control therefor during normal operation of the automobile is shown in Fig. 9. It will be observed that switch 150 is normally closed and completes the circuit up to a dash pot 152. In said dash pot 152 are contacts 153 and 154 which are mounted on springs extending laterally inwardly from the sides of the dash pot. Opposite contacts 153 and 154 are contacts 155 and 156, respectively, connected together electrically by means of a spring support 157. A pin 158 controlled by spring 159 and piston 160 normally bears against the support for contact 153 to make the circuit betwen contacts 153 and 155, and to break the circuit between contacts 154 and 156. Under normal conditions, therefore, shunt circuit 164 is broken by the separation of contacts 154, 156, and interrupter 149 controls the circuit.

In order to cut the ignition it is necessary to keep the primary circuit shorted by completing the shunt circuit 164. This of course must be done in timed relation to the operation of valve 82 which controls positive clutch 17. For this reason, the mechanical movements of switch 150 are controlled from the same linkage 145 which controls valve 82.

Assuming that the control for valve 82 has been operated to down shift into the torque converter, bell crank 151 is rotated clockwise to the position shown in Fig. 7. It will be noted that lower contact 161 is mounted on a spring which is just sufficiently long to catch a washer 162 mounted on the end of a rod 163, which in turn is connected to piston 160. The clockwise movement of bell crank 151 will therefore raise piston 160 and simultaneously break the circuit through switch 150 and through contacts 153 and 155, the latter by reason of the raising of contact 153 from contact 155. At the same time the circuit will be made through contacts 154 and 156. Upon continued rotation of bell crank 151 in a clockwise direction, washer 162 will be freed and piston 160 will descend toward contacts 153 and 154. The freeing of washer 162 will also cause the circuit to be completed through switch 150. Downward movement of the piston will be retarded due to the dash pot action, and a predetermined time interval will elapse between a release of washer 162 and the reengagement of pin 158 with contact 153. As piston 160 descends beyond this point, it will first complete the circuit between contacts 153 and 155, which thereby shunts the ignition circuit as shown in Fig. 8, the other pairs of contacts having been previously made, and then upon final downward movement will break the circuit through contacts 154 and 156. During the interval in which the shunt circuit is in the condition shown in Fig. 8, torque will be removed from teeth 35 and, the pressure having been previously removed from behind the pistons, said pistons will be retracted under the combined influence of the pressure within the torque converter and the retractive effort of springs 37. The duration of the shorting of the circuit is only a matter of a few explosions of the engine so that the running of the engine is not seriously affected.

It will be noted that shunt circuit 164 is established in dash pot 152 on the upward movement of piston 160 as well as on its downward movement and hence, were it not for switch 150, the ignition circuit would be shunted and the torque removed from pistons 34 before the fluid had an opportunity to escape from behind the pistons. Switch 150 is so constructed, however, that it will be opened before piston 160 begins to move and will remain open during the entire interval in which the shunt circuit is completed through the dash pot. This is accomplished by making return spring 159 stronger than the spring supporting contact 161 of switch 150. The actual shunting of the ignition circuit is therefore limited to the return movement of piston 160 which provides sufficient time to allow the pressure to drop behind pistons 34. The time elapsing between the actuation of valve 82 and the shunting of the ignition circuit may be approximately half a second. The duration of the shunt can be predetermined by a proper relation between the strength of return spring 159 and the fluid leak in the dash pot so as not to exceed, for example, one-quarter of a second.

Pistons 34 are subject to centrifugal force which varies as the square of the speed of the vehicle. The size of the pistons and the magnitude of the retractive effort of springs 37 and the unbalanced hydraulic pressure may be so predetermined as to prevent the retraction of the pistons at speeds at which torque multiplication through the converter 12 is no longer possible, since at such speeds no advantage can be gained by driving through the converter instead of through the clutch 17.

It is understood that the fasteners, bearings, and gaskets necessary for the operation of a device of the class described may be arranged to suit the designer and accordingly are not described herein in detail. It is understood further that the foregoing description is merely illustrative of a preferred embodiment and that the scope of the invention therefor is not to be limited thereto but is to be determined by the appended claims.

We claim:

1. A transmission comprising a drive shaft, a driven shaft, torque converting mechanism, reversing mechanism of the differential type having at least three cooperating elements, one of said elements being connected to the driven shaft, means connecting the torque converting mechanism with the driving shaft, means continuously effective to connect the torque converting mechanism with another of said elements, releasable means connecting the torque converting mechanism with the driven shaft to provide parallel connections between the torque converting mechanism and the driven shaft, means for arresting the rotation of a third element to change the direction of rotation of the driven shaft with respect to the drive shaft, and means associated with the arresting means for releasing the releasable connection before the rotation of the third element is arrested.

2. A transmission comprising driving and driven shafts, hydraulically controlled devices for connecting the shafts in different speed ratios, a hydraulic system deriving its power from the drive shaft for controlling some of said devices only, a second hydraulic system deriving its power from the driven shaft for controlling at least one device not controlled by the first system, said second system having a normally uncovered bleed opening which prevents a building up of operating pressure in said system except above a predetermined speed of the driven shaft, thereby preventing a speed ratio change through the device controlled by said system until said predetermined speed is attained, and means for insuring a full ratio change at said predetermined speed, thereby preventing a long slip period in the connecting device.

3. A transmission comprising a drive shaft, a driven shaft, torque converting mechanism and a reversing mechanism connected in series between the shafts, said reversing mechanism comprising a plurality of relatively rotatable elements one of which is non-releasably connected to the driven shaft, positive means for arresting the rotation of a second element and means for relating the movement of a third element to the movement of the driven shaft whereby to facilitate the arrest of the second element when the driven shaft is not rotated.

4. A transmission for a vehicle comprising a drive shaft, a driven shaft associated with the wheels of the vehicle and movable in timed relation therewith, torque converting mechanism connected between said shafts and including differential gearing having one element connected to the driven shaft, positive means operable when the transmission is conditioned for reverse for arresting the rotation of a second element, and friction means effective when the vehicle is not in motion for arresting the rotation of the second element through the intermediary of a third element for assisting the operation of the positive arresting means.

5. A transmission comprising a drive shaft, a driven shaft, torque converting mechanism connected between said shafts and including planetary gearing having a ring gear connected to the driven shaft, a carrier and a sun gear, positive means operable when the transmission is conditioned for reverse for engaging the carrier to arrest the rotation thereof and friction means cooperating through the intermediary of the sun gear and the driven shaft to assist in arresting the rotation of the carrier to facilitate the engagement of the positive means.

6. A transmission for a vehicle as described in claim 4, and control means for the positive means and for the friction means, said control effecting a sequential movement of the positive and friction means such that during the first portion of the movement of the control means the friction means becomes effective and is then released just prior to the engagement of the positive means.

7. A transmission for a vehicle comprising a drive shaft, a driven shaft, and torque converting mechanism connected between said shafts, said mechanism including a rotatable element the rotation of which may be arrested to effect a speed change through the mechanism, positive means for arresting the rotation of the element, a second element, fluid controlled means for associating the second element with the driven shaft and with the first-mentioned element to relate the movement or lack of movement of the driven shaft to the movement of the first-mentioned element, and a valve controlling the fluid means, said valve being mechanically connected to the positive arresting means.

8. A transmission as described in claim 7, said valve having portings which permit the fluid controlled means to operate upon the initial movement of the positive means in its arresting movement and which release the fluid controlled means just prior to the engagement of the positive means.

9. A transmission comprising a drive shaft, a driven shaft, torque converting mechanism connected to the drive shaft, a ring gear connected to the driven shaft, a sun gear non-releasably connected to the said mechanism, planet pinions meshing with the sun and ring gears, a carrier for the planets, a toothed element connected to the carrier, a cooperating toothed device for engaging the toothed element to hold the said element against rotation, a clutch for connecting the torque converting mechanism to the driven shaft, fluid means for operating the clutch, a valve for controlling the fluid means, a manual control element, and means connecting the control element to the toothed device and to the valve to cause the valve to move in timed relation to the toothed device, said valve having portings which cause the clutch to engage prior to the engagement of the toothed device with the toothed element to lock the carrier and its associated toothed element to the driven shaft and then release the clutch immediately before the toothed device engages the toothed element.

10. In a torque transmitting mechanism for a prime mover having a speed regulator, fluid control means for transmitting the torque of the prime mover, a valve for controlling the fluid means, and means connecting the valve to the speed regulator, said means including an overcenter device for preventing a movement of the valve except at the extreme positions of the speed regulator, and said overcenter device comprising a pivoted arm connected at its free end to the speed regulator, an arm connected to the valve, and a compressible medium connecting the arms, said arms being adapted to swing past one another to alternately compress and release said medium.

11. In a torque transmitting mechanism for a prime mover having an ignition system, means for multiplying the torque of the prime mover, positive clutch means in parallel with the torque multiplying means, said positive clutch means having a movable element for controlling the engagement and disengagement thereof, means for impressing a force upon the movable member of the clutch while the clutch is in engaged condition, said force being applied in a direction to release the clutch such that pending the release of torque on the clutch itself the releasing force is ready to move the clutch to released position, and means for relieving the torque on the clutch when the releasing force is established, said torque-relieving means comprising a normally broken circuit in parallel with the ignition circuit, means for establishing the circuit, and mechanical means controlling the circuit establishing means.

12. In a torque transmitting mechanism for a prime mover having an ignition circuit, a positive coupling device, means for establishing a releasing bias on the device, means for relieving the torque on the device comprising a normally broken circuit in parallel with the ignition circuit, means for establishing the normally broken circuit, dash pot means for controlling the operation of the circuit establishing means, and means for coordinating operation of the bias establishing means with the operation of the dash pot.

13. In a torque transmitting mechanism for a prime mover having an ignition circuit, a positive coupling device, pressure differential means for releasing the device, means for relieving the torque on the device comprising a normally broken circuit in parallel with the ignition circuit, means for establishing the normally broken circuit, dash pot means for controlling the operation of the circuit establishing means, and means for simultaneously operating the pressure differential means and the dash pot, said dash pot delaying the establishment of the normally broken circuit to permit the pressure differential to be effected.

14. In a power transmission system having an ignition circuit which is shunted under predetermined conditions to facilitate a speed ratio change, a plurality of pairs of contacts in series in the shunt circuit, a reciprocable plunger for controlling the sequence of operation of two of said pairs of contacts, means for limiting the effectiveness of the plunger to control the contacts to the return stroke thereof, and dash pot means controlling the speed of the plunger on its return stroke to time the shunting of the ignition circuit to the speed ratio change.

15. In a torque transmitting mechanism for a prime mover having an ignition system, said mechanism having a positive coupling device which is releasable under the combined influence of a pressure differential means biasing the device to released position and torque relief resulting from an interruption in the ignition system, means for interrupting the ignition comprising a pivoted arm, a pair of normally closed contacts on said arm, a dash pot comprising a cylinder, a piston in said cylinder, a rod extending through said cylinder and adapted to latch one of the contacts, a switch arm in the path of movement of said piston, a contact on said switch arm, a second switch arm having a contact thereon, a third switch arm having a contact normally spaced from the contact on the second switch arm and another contact normally in engagement with the contact on the first switch arm, means for rotating the pivoted arm whereby to latch the rod to pull said rod and its associated piston through said cylinder, said arm contacts being separated throughout this movement and the contacts on said switch arm being first made and then reversed, said rod becoming unlatched at the end of the movement to remake the contacts on the arm, and resilient means to return the piston, said piston first consuming sufficient time prior to its striking the first switch arm to enable the releasing bias to be established on the positive device, then remaking the separated contacts on the first and third switch arms to complete the circuit and thus interrupt the ignition circuit, thereby relieving the device of torque, and finally breaking the contacts on the second and third switch arms to restore the system to its original condition.

16. A transmission comprising driving and driven shafts, hydraulically operated devices for connecting the shafts in different speed ratios, a hydraulic system for controlling some of said devices only, a second hydraulic system for controlling at least one device not operated by the first system, said systems being operated at different pressures, and a pressure-differentially operated valve for connecting the second system to the first system when the pressure in the first system is below that in the second.

17. A transmission as described in claim 16, the second system having a bleed opening for preventing the building up of operating pressure in said system except above a predetermined speed of the driven shaft, and means associated with said valve for covering the bleed opening when the valve is operated to connect the two systems.

HAROLD NUTT.
RICHARD L. SMIRL.

REFERENCES CITED

The following references are of record in the file of this patent:

UNITED STATES PATENTS

| Number | Name | Date |
|---|---|---|
| 2,102,781 | Bieretz | Dec. 21, 1937 |
| 2,181,647 | Wheaton | Nov. 28, 1939 |